United States Patent [19]

Evans, Jr. et al.

[11] 3,756,431
[45] Sept. 4, 1973

[54] ARTICLE HANDLING DEVICE

[75] Inventors: John S. Evans, Jr., Houston, Tex.;
John D. Paulsen, Naperville, Ill.

[73] Assignee: Mark Products, Inc., Houston, Tex.

[22] Filed: June 4, 1971

[21] Appl. No.: 150,050

[52] U.S. Cl. ............ 214/83.1, 214/16.4 A, 214/508
[51] Int. Cl. .............................................. B65g 1/06
[58] Field of Search ..................... 214/16.4 A, 83.1; 198/233, 121–123

[56] References Cited
UNITED STATES PATENTS

| | | | |
|---|---|---|---|
| 3,561,619 | 2/1971 | Weir | 214/16.4 A |
| 3,182,827 | 5/1965 | Frost | 214/83.1 |
| 2,927,705 | 3/1960 | Girardi | 214/83.1 |
| 3,606,039 | 9/1971 | Weston et al. | 214/16.4 A |

*Primary Examiner*—Gerald M. Forlenza
*Assistant Examiner*—R. Johnson
*Attorney*—Hyer, Eickenroht, Thompson & Turner

[57] ABSTRACT

The device disclosed includes a self-propelled truck for moving along a row of tiered storage bins. A roller-type conveyor has one end pivotally mounted on the truck with the other end free to move vertically. A platform is mounted for movement with the free end of the conveyor to support an operator in position to move articles from the storage bins to the conveyor.

5 Claims, 3 Drawing Figures

John S. Evans, Jr.
John D. Paulsen
INVENTORS

BY *Hyer, Eickenroht,*
*Thompson & Turner*

ATTORNEYS

ARTICLE HANDLING DEVICE

This invention relates to material handling devices generally and in particular to a device for gathering a plurality of articles from a row of tiered storage bins of varying heights.

Most articles in a warehouse are located in storage bins that are arranged in rows with aisles between them. The bins are usually tiered to three or four levels above the floor of the warehouse. Most of the time orders received at a warehouse include several different articles. Therefore, the person filling such orders has to go to several storage bins to gather the articles for delivery to the delivery zone of the warehouse.

It is an object of this invention to provide a device for use in picking articles from a row of tiered storage bins in a warehouse that will provide transportation for the operator, or the person selecting the articles, along the row of tiered storage bins and also support the operator at the proper level for removing the articles from the storage bins, thereby greatly facilitating the gathering of the group of articles desired.

It is another object of this invention to provide a device for use in gathering articles from storage bins of different heights that supports the operator at the desired height for removing the article from the various bins and that will provide space for collecting these articles and carrying them along with the operator until a desired number of articles have been gathered after which the device will transport the selected articles to a discharge point where they can be transferred from the device to additional conveying means or the like.

These and other objects, advantages, and features of this invention will be apparent to those skilled in the art from a consideration of this specification, including the attached drawings and appended claims.

Figure 2:
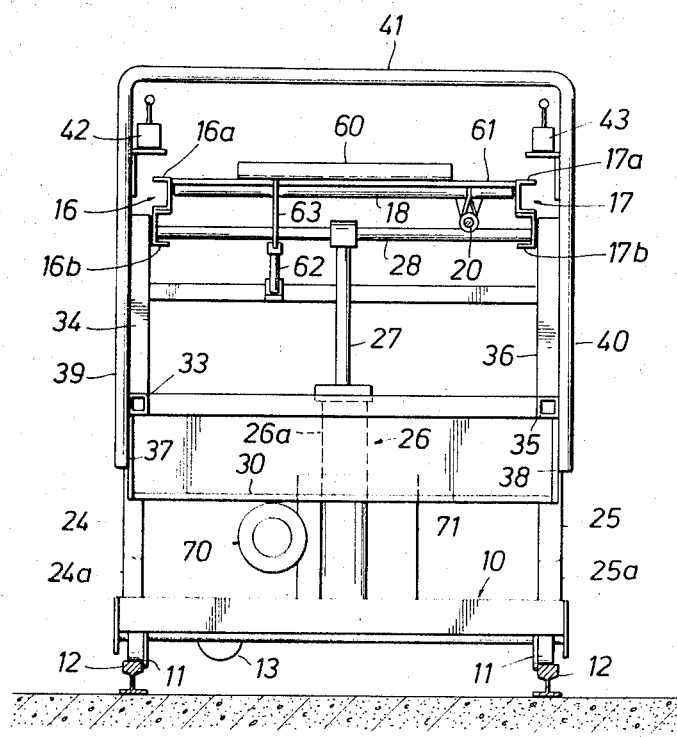
FIG. 2 is an end view of the device of FIG. 1 taken along line 2—2 of FIG. 1.
Figure 3:
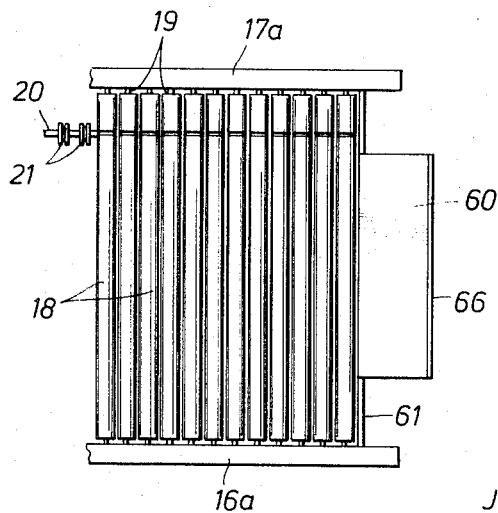
FIG. 3 is a top view of a portion of one end of the conveyor employed with the device taken along line 3—3 of FIG. 1.

The device includes a vehicle or truck for moving the device along a row of storage bins. In the embodiment shown, the truck comprises platform 10 which is supported by wheels 11 on parallel, spaced tracks 12 (FIG. 2). Hydraulic motor 13 is mounted on the truck and drives axle 14 and the wheels mounted thereon to move the truck up and down the track.

The device includes a conveyor. In the embodiment shown, the conveyor includes parallel, spaced side members 16 and 17 and a plurality of rollers 18 extending between the two side members. The rollers are mounted side by side in parallel, spaced relationship on shafts 19 for rotation around their longitudinal axes. The side members include roller mounting U-shaped channels 16a and 17a positioned with their webs facing and conveyor mounting and reinforcing channels 16b and 17b. The latter channels have their flanges facing each other. The two channels making up each side member are assembled, as shown in FIG. 2, one above the other with their adjacent flanges connected, as by welding.

Means are provided to actuate the conveyor to move articles thereon toward one end or the other. In the embodiment shown, drive shaft 20 extends the length of the conveyor and rotates a plurality of drive pulleys 21, one of which is located on the shaft below each roller. A drive belt 22 is wrapped around each drive pulley and a groove in the roller located above the pulley so that rotation of drive shaft 20 will rotate each roller in one direction or the other depending upon the direction of rotation of the shaft. Power for rotating the shaft in the desired direction is supplied by motor 23.

Means are provided to mount one end of the conveyor on the truck for pivotal movement to allow the other free end to be moved vertically as required to position the free end adjacent the desired storage bin. In the embodiment shown, the mounting means includes support posts 24 and 25 located on opposite sides of truck 10 on the left-hand end thereof as viewed in FIG. 1. Diagonals 24a and 25a help to support the posts in a vertical position. The upper ends of the support posts support shaft 25 for rotation. Appropriate bearings (not shown) are mounted in the upper end of the posts for this purpose. Shaft 25 in turn supports the left-hand end of the conveyor for rotation with the shaft around its longitudinal axis.

Means are provided to rotate the conveyor to move its free end to the desired position. In the embodiment shown, such means comprises power cylinder 26, which includes outer cylinder 26a and a piston (not shown). Piston rod 27 is connected to the piston at one end and pivotally connected to side members 16 and 17 of the conveyor at the other end. The rod is connected to the side members through shaft 28 and appropriate bearings (not shown) so that the rod is pivotally connected to the conveyor for relative rotation between the rod and the conveyor around the longitudinal axis of shaft 28. At the other end of the power cylinder, pin 29 pivotally connects the power cylinder to truck 10. Thus, the extension or retraction of piston rod 27 will move the conveyor around the longitudinal axis of shaft 25.

A platform is provided for the operator of the vehicle adjacent the free movable end of the conveyor to move with the free end and to support the operator in position to move articles from the storage bins to the conveyor. In the embodiment shown, platform 30 is supported adjacent the movable end of the conveyor by L-shaped frame 32. The frame includes two L-shaped arms attached to opposite sides of the conveyor. As shown, the L-shaped arm on the left-hand side in FIG. 2 includes horizontal member 33 and vertical member 34. The L-shaped member on the right-hand side includes horizontal member 35 and vertical member 36. The vertical members and horizontal members are parallel of each other, respectively. Platform 30 is attached to and extends between the two horizontal members and is supported thereon by depending support members 37 and 38 attached to the left-hand side of the platform as viewed in FIG. 1 and support members 39 and 40 attached to the right-hand end of the platform as viewed in FIG. 1. Members 39 and 40 extend upwardly above the platform and are connected together at their upper ends by bar 41 to provide a hand rail for the operator to hold onto as he rides the platform. Members 39 and 40 also provide a convenient place to mount control valves 42 and 43 that, in the embodiment shown, control the flow of hydraulic fluid to the various hydraulic motors that power the device.

Figure 1:
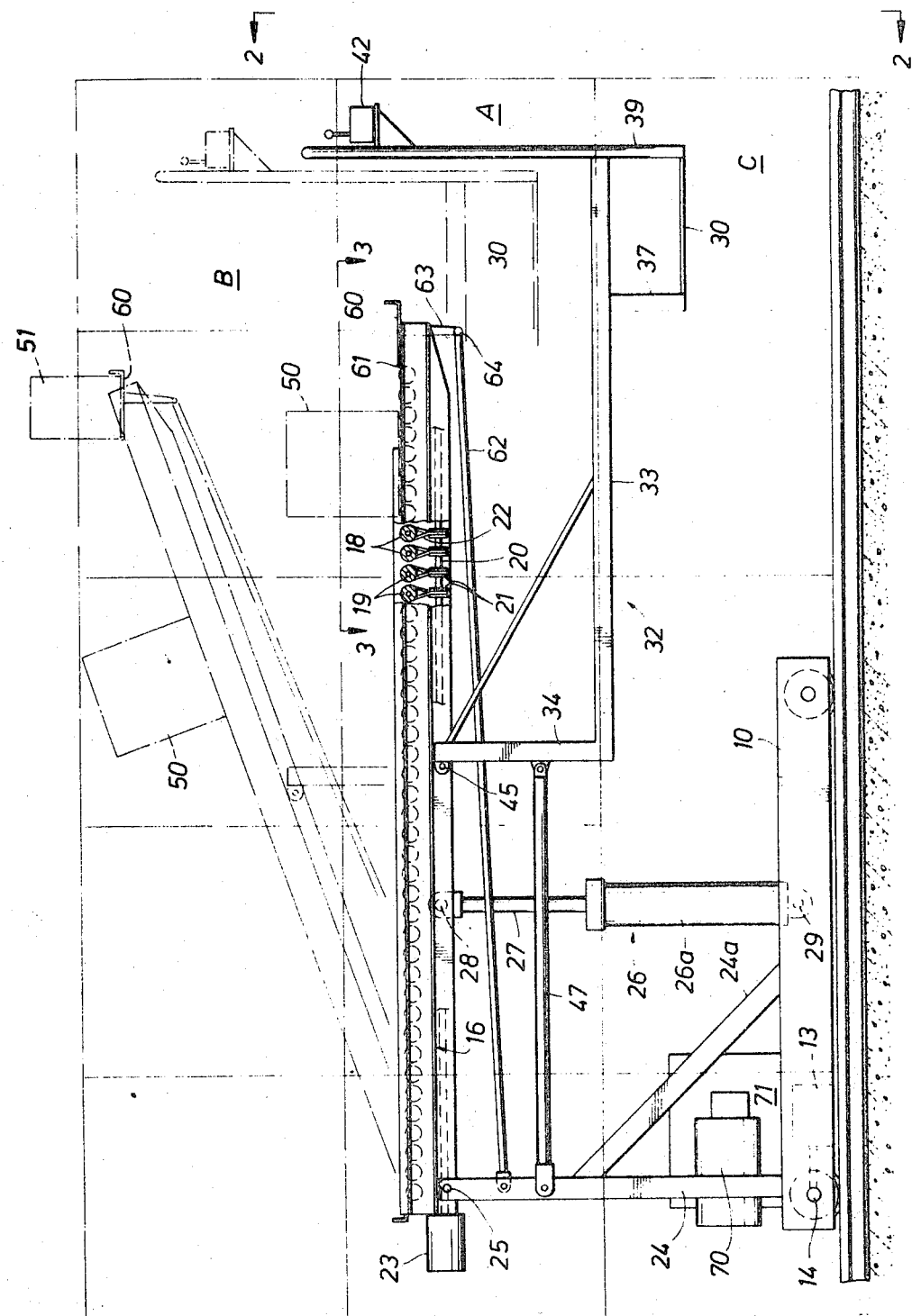
FIG. 1 is a side view in elevation of the preferred embodiment of the device of this invention.

It is another feature of this invention that the means mounting platform 30 for movement with the free end of the conveyor also maintains the platform substantially horizontal as it moves up and down with the conveyor. In the embodiment shown, this is accomplished by connecting the upper ends of vertical support members 34 and 36 to the side frames of the conveyor so that they will pivot around a common horizontal axis. In the embodiment shown, this would be the longitudinal axis of pins 45. To hold vertical members 34 and 36 in a vertical position so that platform 30 remains horizontal, links are connected between each of the vertical members and support posts 24 and 25. Only one such link member, link 47, can be seen in the drawings, and this is in FIG. 1. Support post 24 and vertical member 34, as shown in FIG. 1, combine with side member 16 and link 47 to form a parallelogram such that vertical member 34 and support member 24 will remain parallel and vertical as the conveyor pivots around shaft 25. The same is true of support member 36 and its associated link and connecting member. With these vertical members remaining vertical, then horizontal members 33 and 35 and platform 30 will remain horizontal as the free end of the conveyor moves up and down. The relative position of the end of the conveyor with respect to platform 30 will change as the angle of the conveyor changes. By proper positioning of platform 30, however, the operator can conveniently move articles from the storage bins to the conveyor in any of its working positions. For example, as shown in FIG. 1, with the device in the position shown in solid lines, the operator standing on platform 30 can very conveniently move articles from bin A, such as package 50, then he can raise the end of the conveyor belt to move his platform to the position shown in dotted lines to move package 51 from storage bin B. At this level, the end of the conveyor belt will be somewhat higher above platform 30 than in the position for moving articles from storage bin A, but it will still be in convenient reach of the operator. By the same token, when positioned to remove articles from bin C, the end of the conveyor will be substantially closer to the level of platform 30, but here again the articles in bin C can be moved to the conveyor with relative ease by an operator standing on the platform.

To assist the operator in moving the articles to the conveyor, loading shelf 60 is positioned at the end of the conveyor adjacent the last roller. The shelf is pivotally connected between the ends of support members 16 and 17 by shaft 61. Holding the shaft in a substantially horizontal position is rod 62 that has one end connected to mounting post 24 and the other to shelf support bracket 63. Rod 62 and shelf support bracket 63 are pivotally connected together and combine with shaft 61 to form another parallelogram that will maintain shelf 64 substantially horizontal as the conveyor is pivoted to move its free end up and down. Thus, when the conveyor belt is in the dotted line position of FIG. 1, shelf 60 is horizontal, allowing article 51 to be conveniently placed thereon and then pushed onto the conveyor by the operator.

In use, the operator can actuate the conveyor drive system to move the articles from the loading end as he loads the articles onto the conveyor. Stop 65 on the end of the conveyor away from the operator keeps the articles from running off the conveyor. This will allow him to completely fill up the conveyor from one end to the other with articles before he must move the device to an unloading station. Usually this will allow the operator to fill his order before having to move to an unloading station and thus greatly facilitate his work. When unloading, the conveyor is reversed to feed the articles to the operator. Stop 66 on shelf 60 holds the articles until they can be unloaded.

The device as shown is powered by hydraulic motors for driving the drive shaft to actuate the conveyor, for providing power to the wheels of the vehicle, and for raising and lowering the free end of the conveyor. The hydraulic hoses are not shown to keep the drawings as simple as possible. Hydraulic pump 70 that provides the hydraulic fluid under pressure for these purposes is driven by electric motor 71. Electrical power can be supplied in any convenient manner, as for example, by an overhead conductor in the manner of an electric railroad engine.

From the foregoing, it can be seen that this invention is one well adapted to attain all of the ends and objects hereinabove set forth, together with other advantages that are obvious and that are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for use in picking articles from a row of storage bins in a warehouse comprising a truck movable along the row of storage bins, a conveyor, means mounting one end of the conveyor on the truck for pivotal movement to allow the other free end to be moved vertically as required to position the free end adjacent the desired storage bin, a platform, means mounting the platform adjacent the movable free end of the conveyor for movement therewith to support an operator thereon for moving articles from a storage bin to the conveyor said platform mounting means including an L-shaped frame having a vertical portion and a horizontal portion upon which the platform is located, means pivotally connecting the vertical portion to the conveyor and link means connected between the vertical portion and the conveyor mounting means to maintain the vertical portion vertical and the horizontal portion and the platform thereon horizontal as the conveyor is pivoted to move the free end vertically to a position adjacent the desired storage bin, and means for moving the free end of the conveyor and the platform vertically as required to position the operator and the free end of the conveyor at the desired height for removing articles from the storage bins and placing them on the conveyor.

2. A device for use in picking articles from a row of storage bins in a warehouse comprising a truck movable along the row of storage bins, a conveyor, means mounting one end of the conveyor on the truck for pivotal movement to allow the other free end to be moved vertically as required to position the free end adjacent the desired storage bin, a platform, means mounting the platform adjacent the movable free end of the conveyor for movement therewith to support and operator thereon for moving articles from a storage bin to the conveyor, a loading and unloading shelf, means mounting the shelf adjacent the free end of the conveyor for articles to be pushed from the shelf onto the conveyor and to receive articles from the conveyor, and means for moving the free end of the conveyor and the platform vertically as required to position the operator and the free end of the conveyor at the desired height for removing articles from the storage bins and placing them on the conveyor.

3. The apparatus of claim 2 in which the shelf mounting means includes means attaching one side of the shelf to the end of the conveyor for pivotal movement around a horizontal axis and means holding the shelf horizontal as the conveyor is pivoted to move the free end vertically to provide a horizontal surface upon which articles from the storage bins can be placed before being moved onto the conveyor.

4. A device for use in picking articles from a row of storage bins in a warehouse comprising a truck movable along the row of storage bins, a conveyor, comprising a plurality of rollers mounted side by side for rotation around their longitudinal axis and means for rotating the rollers in either direction to move articles in either direction along the conveyor, means mounting one end of the conveyor on the truck for pivotal movement to allow the other free end to be moved vertically as required to position the free end adjacent the desired storage bin, a platform, means mounting the platform adjacent the movable free end of the conveyor for movement therewith to support an operator thereon for moving articles from a storage bin to the conveyor, and means for moving the free end of the conveyor and the platform vertically as required to position the operator and the free end of the conveyor at the desired height for removing articles from the storage bins and placing them on the conveyor.

5. An article handling device for use in gathering a plurality of articles from a plurality of storage bins of varying heights and for transferring the articles to a conveyor system comprising a self-propelled truck, an elongated roller conveyor, means mounting one end of the conveyor on the truck for pivotal movement around a horizontal axis transverse the direction of travel of the truck, a horizontal platform for supporting an operator, means mounting the platform adjacent the free end of the conveyor for movement with the conveyor and for maintaining the platform horizontal as the platform moves vertically with the conveyor, means for pivoting the conveyor to move the free end of the conveyor and the platform vertically as required to position the end of the conveyor and the platform for an operator on the platform to conveniently move an article or articles from the storage bin to the conveyor, means for actuating the conveyor to move articles along the conveyor to make room for additional articles and for moving the articles to one end of the conveyor for transfer to a conveyor system when the desired number of articles have been collected from the bins.

* * * * *